March 10, 1942.   C. D. LANE ET AL   2,276,210
ACID PURIFICATION AND RECOVERY PROCESS
Filed Jan. 12, 1940
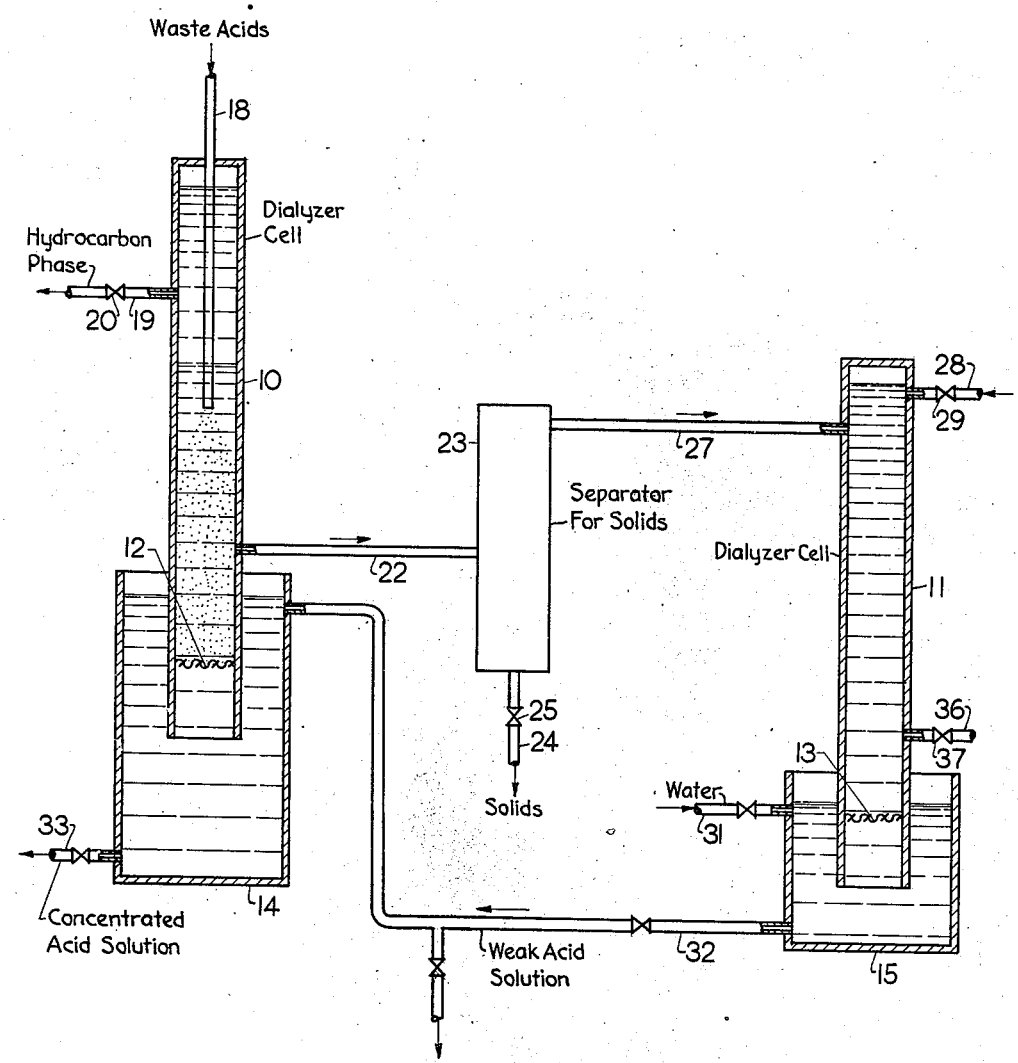
Inventors: Carl D. Lane
Charles H. Duffy
By their Attorney:

Patented Mar. 10, 1942

2,276,210

UNITED STATES PATENT OFFICE 2,276,210

ACID PURIFICATION AND RECOVERY PROCESS

Carl D. Lane, Torrance, and Charles H. Duffy, Long Beach, Calif., assignors to Shell Development Company, San Francisco, Calif., a corporation of Delaware Application January 12, 1940, Serial No. 313,500

3 Claims. (Cl. 210—62)

The present invention relates to the purification and recovery of acids which have become contaminated with organic impurities, and pertains to an improved method for the treatment of waste or spent acids obtained in a wide variety of chemical processes. In one of its embodiments, the invention provides a novel process for the regeneration or purification of oxy acids, particularly strong polybasic inorganic acids, which have become spent and unsuitable or undesirable for re-use in certain chemical processes because of the presence of contaminating organic impurities. The invention also provides a novel process in accordance with which acids, particularly inorganic oxy acids of the type of sulfuric acid, containing relatively small amounts of non-filterable impurities, may be purified and/or regenerated without substantial or excessive dilution of such acids during the purification or recovery step, and without any substantial loss of such acid as by its decomposition.

The process of the present invention is applicable to the purification, recovery and/or regeneration of acids generally. The process is particularly adaptable for the purification of acids which are contaminated with organic impurities, especially carbonaceous substances, such as those formed during the contacting of the acids with carbonizable organic compounds. More specifically, the invention finds utility in the recovery of substantially pure acids from waste acids contaminated with relatively small percentages of carbonaceous organic reaction products present in such acids in a colloidal state.

Although the process of the invention may be used with advantage wherever acids have become contaminated with relatively small percentages of organic impurities, particularly with carbonaceous substances, the invention is particularly adapted for the recovery, purification and/or regeneration of inorganic oxy acids, such as sulfuric acid, phosphoric acid, sulfonic acid, benzene sulfonic acid, chlor-sulfonic acid, and the like, as well as of their mixtures, which acids have become contaminated with carbonaceous substances such as those formed by the contact of the aforementioned and similar acids with olefinic compounds. It is to be understood, however, that other inorganic and organic acids may also be effectively purified in accordance with the present process, to separate therefrom the relatively small percentages of contaminating organic impurities, particularly of the carbonaceous type.

For the purpose of a clear description of the present invention, it will be described with particular reference to the recovery and purification of sulfuric acid contaminated with organic impurities, particularly with carbonaceous substances. Such contaminated sulfuric acid may be obtained when this acid has been used as a catalyst for the alkylation of isoparaffins by means of olefins as this is described for example in copending applications, Serial No. 150,544, filed November 26, 1937, and Serial No. 276,062, filed May 27, 1939. It is to be understood that the invention may be applied with advantage for the regeneration and recovery of other alkylation acids, such as for example those which have been used for the alkylation of aromatic hydrocarbons, phenols or the like, as this is described in U. S. Patent No. 2,051,473, also may be used advantageously for the regeneration and recovery of acids, particularly inorganic oxy acids, which have been employed in other reactions. As illustrations of such types of waste acids which may be treated in accordance with the process of the present invention reference may be made to acids which have been employed for the polymerization of olefins, as described in U. S. Patents Nos. 2,007,159, 2,007,160, 2,055,415, 2,142,937 and 2,174,247; acids removed from the manufacture of alkyl sulfate salts or the like, as disclosed in U. S. Patents Nos. 2,078,516 and 2,139,393, or from the production of sulfonic acids as shown in U. S. Patent No. 1,947,652; acids which have been used for the direct hydration of olefins; acids derived from the manufacture of ethers, as disclosed in U. S. Patent No. 1,968,601, or from the refining of petroleum, as described in U. S. Patent No. 1,898,348, or from other suitable sources. As stated, acids, especially inorganic oxy acids, contaminated with relatively small percentages of colloidal carbonaceous materials may be recovered and/or purified according to the present process.

When an oxy acid, such as sulfuric acid, is used for the alkylation of isoparaffins with olefins or for the manufacture of other compounds described hereinabove, for example, for the formation of alkyl sulfate salts incident to the production of alcohols, the separated oxy acid is found to be discolored with contaminating organic impurities. It has been previously proposed to recover the oxy acid, such as the sulfuric acid, from the sludge acids by diluting the acid sludge with water and/or steam to hydrolyze and separate a part of the organic impurities. The remaining acid is however still highly discolored due to the presence therein of carbonaceous materials, the percentage of which is usually comparatively small, ranging from about 1% to about 10% by volume of the waste acid. In order to remove this carbonaceous material, which is believed to be in a colloidal state in the acid sludge, it has been previously proposed to carbonize this remaining organic matter by oxygen and/or heat to convert it to carbon dioxide and like volatile compounds. Such a procedure is highly uneconomical due to the comparatively high consumption of acid during the carbonization step. Furthermore, if the oxidation step for the removal of the carbonaceous impurities be attempted by agitating the acid liquor (as obtained from the dilution of the acid sludge to separate the water insoluble organic impurities) with air or heated gases or the like, it is found that while the amount of organic material may be materially decreased, a substantial amount still remains in a finely divided form and cannot be removed by filtration. Such remaining carbonaceous material does not separate even upon further dilution with water and renders the acid unsuitable for continued concentration and re-use. Such discolored or "black acids" are unsuitable, even after re-concentration, for many uses for which pure or uncontaminated acids are employed. For example, the discolored or black sulfuric acid, although it may be used in the sulfation of olefins, is unsuitable and/or undesirable as a catalyst for the alkylation of isoparaffins with olefins.

It has now been discovered that acids which are contaminated with organic impurities may be purified, decolorized and/or rendered suitable for further use for all types of processes in which the corresponding fresh or uncontaminated acids are employed, by subjecting such contaminated acids to a dialysis. It has been further discovered that the so-called "blacks acids," i. e. acids which have been discolored by carbonaceous impurities may be efficiently and economically purified and regenerated by subjecting them to dialysis. Also, it has been found that the organic materials, particularly the carbonaceous substances, which cause the discoloration of oxyacids, such as sulfuric acid, when such acids are brought in contact for example with olefinic hydrocarbons, may be completely and efficiently removed from such acids, the recovered acids being thereby purified and rendered suitable for the most exacting uses for which the uncontaminated or fresh oxy acids are employed, such recovery of the oxy acids being possible when the contaminated acids are subjected to dialysis as described more fully hereinbelow. Furthermore, when operating in accordance with the process of the present invention it is possible to recover substantially or even completely purified acids, such a inorganic oxy acids, from mixtures thereof with relatively small percentages of carbonaceous impurities present in the acids in a colloidal and therefore unfilterable state, without excessive dilution of the recovered purified acids, by subjecting the contaminated acids to a dialysis operation in which relatively weaker, but nevertheless acid-containing solutions, are employed on the side of the diffusing membrane opposite to that wherein the contaminated acids are placed.

In accordance with one specific embodiment of the process of the present invention the recovery of the acid from black acids, such as sulfuric acid contaminated with relatively small percentages of carbonaceous impurities, is effected by subjecting the black or contaminated acid solution to a dialysis while employing a relatively weaker uncontaminated acid solution or water on the other side of the semi-permeable, diffusing or dialyzing membrane. Since it is desired to separate the acid from the impurities contained therein, the uncontaminated acid solution used as the liquid into which the diffusion of the acid from the contaminated solution occurs, must necessarily be of a concentration which is lower than that of the acid treated. Generally, the use of water or of very highly diluted acidic solutions results in very weak or highly diluted purified acid solution, thus necessitating excessive treatment for its concentration, for example, by addition of $SO_3$, by dehydration, or the like. However, in certain cases the liquid into which the diffusion of the acid from the contaminated liquor occurs, may consist of water, the recovered purified acid solution being subjected to concentration by any of the well known processes. As will be pointed out hereinbelow the rate or speed of dialysis depends on a number of variables including the acid concentration differential across the membrane. Therefore, the optimum concentration of the acidic solution into which the pure acid from the sludge acid liquor (or from the so-called black acid) will diffuse, will depend on the operating conditions, such as the desired speed of dialysis, the desired concentration of the purified acid solution, and on the economics of its concentration by any of the known processes.

The dialysis according to the present invention is effected by permitting the acid from the sludge or waste acid solution to pass through a suitable semi-permeable membrane into a relatively weaker acidic solution or into water. The membrane, in effect, acts as a super-filter, the openings of the membrane being sufficiently large to permit the passage of the small acid molecules, while substantially retarding or even completely preventing the passage of the acid discoloring impurities which, as stated are believed to comprise carbonaceous reaction products which are held in a colloidal state by the acid. Generally, membranes used in dialysis are colloids themselves. As representative examples of such membranes reference may be made to parchment or parchmentized paper, re-precipitated cellulose and similar regenerated cellulose, Celluloid, cellulose actate, collodion and casein films, formaldehyde-hardened gelatine and glassine paper, mercerized cotton fabric diaphragms, acrylic acid derivative polymers, materials derived from rubber latex, clay-containing gels, and the like. Obviously, when such membranes are employed for the dialysis of acids according to the present invention, and particularly when relatively strong or concentrated inorganic acids, such as sulfuric acid of 80% concentration and higher, are to be dialyzed to separate the organic carbonaceous impurities present therein, the membrane must be inert to the action of such acid and must not be decomposed thereby. The efficacy of a given semi-permeable membrane material for a particular dialysis application also appears to depend not only on its strength and thickness, which must obviously be sufficient to withstand the necessary mechanical strains, and its chemical resistance to the materials, such as the particular acids, undergoing separation, but also on the colloidal structure. The more nearly the membrane or film approaches a true colloid, the faster the rate of flow that is possible through it, and the more complete the separation of the constituents of the treated solution. It may therefore be stated that the ideal membrane material is one which is completely colloidal, but is still strong enough to withstand a considerable fluid pressure when wet, and is unaffected chemically by the materials subjected to dialysis through such membrane.

Although the dialysis according to the present invention may be and usually is effected at atmospheric pressure, it is frequently advisable to exert a pressure sufficient to overcome the osmotic pressure. This is of particular use when the acid to be purified is subjected to dialysis with water or a relatively highly diluted acidic solution on the other side of the semi-permeable diffusing membrane, it being noted that the rate of diffusion of the acid into the water is relatively slow, while the diffusion of the water into the acid phase to be purified is considerably faster. Therefore, unless an external pressure is exerted on the side containing the acid phase, this phase will increase in volume and be diluted to such an extent that only a very small percentage of the acid would be dialyzed or diffused into the phase containing the purified acidic solution. The use of external pressures is also advantageous because it allows the use of relatively thin, truly colloidal membranes which, in turn, permit or cause a relatively faster rate of dialysis. In this connection it must be noted that the unequal pressures are always set up in the dialyzer cell due to the osmotic differential. If the diffusing membrane is very thin and weak, such pressure differential may cause the rupturing of the membrane. To prevent this, it is possible to use thicker membranes (the use of which lowers the rate of dialysis) or to employ fluid pressures on the side of the membrane having the lower pressure.

Instead of employing the contaminated acid on one side of the diffusing semi-permeable membrane and a weaker uncontaminated acidic solution on the other side, it is also possible to dialyze the contaminated acid into water. Obviously, the use of non-acidic water for such dialysis will result in the obtainment of a purified, uncontaminated acid solution the acid concentration of which is lower than that which would have been obtained if an acidic solution was employed as the liquid into which the acid from the contaminated liquor or sludge is to be dialyzed or diffused. However, such use of water may be advantageous because the concentration gradient will be relatively higher thus increasing the rate of diffusion as compared to that obtainable when the solutions on the two sides of the membrane are acidic.

As noted above, the purification in accordance with the process of the present invention is particularly adapted for the purification of strong sulfuric acid which has been used as a catalyst for the alkylation of isoparaffins with olefins and which acid has become contaminated with impurities primarily of the carbonaceous type. These carbonaceous impurities are believed to be in a colloidal state in the waste acid and cannot be completely removed therefrom even after considerable dilution. For instance, sulfuric acid which has been used as an alkylation catalyst until substantial exhaustion of its catalytic effect, and having an acid concentration of about 92%, even after dilution with an equal volume of water, was found to contain a sufficient amount of unprecipitated carbonaceous material to render the concentration of such acid impossible and/or uneconomical by any of the heretofore known methods; this in spite of the fact that the dilution of the acid considerably decreased the impurity content of the acid solution. On the other hand, the purification according to the present process produces an acid solution which is completely or, at least, substantially free from such organic impurities, particularly the carbonaceous substances, so that the re-concentration of the acid may be effected, for example, by vacuum distillation of the water, to produce an impurity-free concentrated acid which is suitable for the alkylation of further quantities of isoparaffins, or for other uses for which pure, concentrated acids are usually employed.

It has also been discovered that although the carbonaceous materials in a contaminated acid, such as sulfuric acid employed for the aforementioned alkylation, are such that they cannot be removed by ordinary filtration, the dialysis of such waste acid converts at least a part of the carbonaceous material into a solid state suspended in the liquid. These solids are then easily removable by filtration, centrifugation, settling or the like. As stated above, the dialysis, besides causing the diffusion of the acid from the contaminated solution into the water or the pure, weaker acidic solution on the other side of the membrane, is also accompanied by a diffusion of water in the other direction. The water thus diffused into the waste or contaminated acid, besides diluting the acid, hydrolyzes a portion of the organic impurities, and simultaneously separates a major portion of the carbonaceous material as a solid suspended in the liquid. These solids may then be removed by any of the aforementioned or like means. The carbonaceous material still remaining in a colloidal state in the waste acid may then be removed by dialysis in the same or preferably another dialyzer cell. Such process of purification and/or recovery of acid from acid solutions contaminated with carbonaceous substances, may be effectively realized in an apparatus of the type shown diagrammatically in the accompanying drawing.

This apparatus comprises two vertically disposed dialyzer cells or tubes 10 and 11 provided with semi-permeable diffusion membranes 12 and 13, respectively. Each of these tubes is disposed in its vessel 14, 15, respectively, which contains the liquid into which the diffusion of the acid from the waste acid to be purified occurs. The waste acid is introduced into the first dialyzer tube 10 through line 18 which extends into the tube 10 to a point intermediate the surface of membrane 12 and the top of tube 10. A discharge pipe 19 (which may be provided with a valve 20) leads from the tube 10 at a point above the discharge opening of line 18, pipe 19 being provided for the continuous or intermittent withdrawal for the removal of water-insoluble hydrocarbons which may be formed during the hydrolysis of the impurities by the water diffusing into the waste acid from the vessel 14, as will be more fully described hereinbelow.

A line 22 leads out of tube 10 from a point somewhat above membrane 12, said line leading into a settler 23 provided with a discharge pipe 24 equipped with a valve 25. A pipe 27 communicates the upper end of settler 23 with the interior of the second dialyzer 11. The upper end of this dialyzer may be provided with a pipe 28 and valve 29 for applying an external pressure on the liquid introduced into said dialyzer. Obviously, if necessary, a pump or like propelling means may be installed in line 27, such pumping means not being shown in the drawing.

Vessel 15 is provided with water inlet pipe 31 and a discharge line 32 leading from its bottom portion into the upper part of vessel 14. The latter is provided with line 33 for the withdrawal of the purified acid solution. It is obvious that the various lines may be equipped with valves, pressure and level controls, pumps, etc., necessary and/or desirable for the realization of the dialysis in accordance with the process.

The operations of the above outlined apparatus will be described in connection with the continuous purification of relatively strong sulfuric acid which contains carbonaceous substances in a non-filterable state, this contaminated acid having been obtained, for instance, as the result of the use of strong sulfuric acid as a catalyst for the alkylation of isoparaffins with olefins. It is to be understood, however, that this apparatus may also be employed for the continuous, discontinuous or batch purification and/or separation of any acid of the class described herein from organic impurities, particularly of the type of carbonaceous materials, which are in a colloidal state in such acid.

Referring again to the drawing, the contaminated acid is fed at a desirable rate through line 18 into dialyzer tube 10. Simultaneously, a relatively weak acidic solution (uncontaminated by any impurities) is conveyed from vessel 15 through line 32 into vessel 14. Due to the difference in the acid concentrations on the two sides of the semi-permeable membrane 12, the acid from the upper portion of tube 10 diffuses through the membrane into the acidic solution in vessel 14, while the water diffuses in the opposite direction and thus dilutes the contaminated acid. As stated above, this dilution causes a separation of the colloidal carbonaceous material as a filterable or otherwise removable solid. In order to prevent this solid substance from settling on the membrane 12 and thus hinder or stop the diffusion therethrough, the acidic solution containing this suspended solid is continuously conveyed through line 22 to settler 23 wherein the solids are caused to be deposited, and may then be removed either continuously or otherwise through line 24. If desired, the precipitation of the solids on membrane 12 may be inhibited by providing tube 10 with some agitating means.

The supernatant acidic solution in settler 23, although free from the suspended solids, still contains some carbonaceous materials which render the acid unsuitable or uneconomical for direct re-concentration and re-use. In order to purify this partially purified acidic solution, it is conveyed through line 27 into the second dialyzer 11 wherein the acid is caused to be diffused through membrane 13 into water introduced into vessel 15 through line 31. Since this water also diffuses into the acidic solution above membrane 13, a pressure in excess of the osmotic differential may be placed on the liquid in tube 11 either by introducing the acidic solution through line 27 at a rate greater than the rate of diffusion of the acid through the membrane, or by exerting an external pressure as by means of an inert gas introduced through line 28.

It is thus seen that the operation of the above-described structure is continuous and, in a sense, countercurrent since the strong contaminated acid is diffused into an uncontaminated, relatively weaker acid solution formed in the second dialyzer cell wherein the relatively weaker and partially purified acidic solution (conveyed from the first dialyzer through line 22, settler 23 and line 27) is dialyzed into water or a still weaker acidic solution. The relatively concentrated pure acidic solution thus obtained in vessel 14 may then be withdrawn through line 33, and may be reconcentrated by any of the known methods, or may, if desired, be employed without such reconcentration in any of the processes in which relatively weak acidic solutions are suitable and/or desirable.

If desired, the purification according to the present process may be effected in the described apparatus in a discontinuous manner. In such a case the contaminated acid to be purified may be introduced into dialyzer cell 10 and kept therein until the desired diffusion of the acid into the aqueous medium in vessel 14 and the diffusion of the water in the opposite direction occur. Thereafter, the solution in tube or cell 10 may be conveyed through settler 23 (for the separation of the solid carbonaceous matter formed during the first diffusion). The semi-purified solution may then be introduced through line 27 into cell 11 for the final diffusion, after which the solution remaining in this cell 11 may be withdrawn through line 36 provided with a valve 37.

Although a settler 23 has been provided for the separation of the solid carbonaceous matter, it is obvious that such separation may be effected by any other known means, such as a filter, centrifuge, or the like. Also, if desired, the number of dialyzers may be varied.

The rate of passage of the contaminated acid through the dialyzers, and of the aqueous solution through vessels 14 and 15, may be controlled to obtain the desired diffusion with a minimum of dilution of the acid to be treated by the water permeating thereinto through the membranes. As stated, this may be also controlled by maintaining pressures on the acid to be purified.

It is to be noted that a hydrocarbon phase may be formed in dialyzer 10, this hydrocarbon fraction, which is water-insoluble, being formed as a result of the hydrolysis of a part of the organic impurities in the acid to be purified. This fraction may be removed from the dialyzer through line 19 provided with valve 20.

Since dialysis depends upon diffusion of a dissolved substance, i. e. of the acid, through a membrane into a region where its concentration is lower, the rate of dialysis depends, at least in part, upon the area of membrane used and upon the difference in concentrations between the inside and outside liquids. Therefore, to obtain the desired diffusion in the minimum time, it is preferable to use cells provided with relatively large membranes, and to maintain the liquid into which the acid diffuses in motion thereby preventing the lowering of the concentration gradient across the semi-permeable membrane.

The following example is presented to illustrate the advantages derived from purifying strong sulfuric acid in accordance with the process of the present invention, it being understood that these examples are not to be construed as limiting the invention.

*Example*

Sulfuric acid previously employed as a catalyst for the alkylation of isoparaffins with olefins and contaminated with carbonaceous materials, was found to contain 90.5 weight percent of $H_2SO_4$ and 6.9 weight percent of carbon in the form of organic impurities including carbonaceous materials which have discolored the acid. This acid was diluted with water until the $H_2SO_4$ concentration dropped to 42%, and was allowed to stand over-night to effect phase separation. The upper oily phase, which comprises the water-insoluble hydrocarbons formed by hydrolysis, was separated, and the aqueous acid phase was found to be dark in color and still containing approximately 0.57% by weight of carbon in the form of carbonaceous impurities. The presence of these impurities rendered the re-concentration of this acid by evaporation difficult and uneconomical. Furthermore, the re-concentrated acid was found to be unsuitable as an alkylation catalyst.

The above-described contaminated acid was diffused through a Celluloid membrane. The acid solution obtained was found to be completely free from carbonaceous materials, was readily re-concentrated by evaporation of excess water, and, after such reconcentration, was an excellent catalyst for the alkylation of isoparaffins with olefins.

Although the invention has been described with particular reference to the purification of sulfuric acid, it is clear that the present process is applicable for the treatment of other acids, both of organic and inorganic origin.

It has been brought out that a portion of the carbonaceous material separates out of the acid during dialysis and dilution in the first dialyzer. It was also pointed out that this carbonaceous material separates out as a solid which may be filtered or otherwise separated from the acid liquor subjected to purification. It has been found, however, that in some cases, particularly when sulfuric acid employed as a catalyst for the alkylation of isoparaffins with olefins, the dilution of such spent acid causes a separation of the carbonaceous material as a relatively viscous liquid resembling a viscous oil. This may then be removed for instance by decanting. The condition of the separated material, i. e. whether it is in the form of a viscous liquid or a solid, depends in part upon the conditions and mode of treating the acid. For example, if a spent acid is subjected to dialysis substantially immediately after its use as a catalyst for the aforementioned alkylation, the carbonaceous matter separating out in the acid subjected to dialysis will be in the form of a viscous liquid. On the other hand, the same acid after standing for a period of time, although subjected to no additional treatment, when purified in accordance with the process of the present invention, will produce a filterable solid probably formed as a result of the oxidation or chemical action of the acid on the non-filterable carbonaceous material.

We claim as our invention:

1. A continuous process for the purification of a strong polybasic inorganic acid solution from small percentages of carbonaceous non-filterable impurities present therein, which comprises continuously conveying said contaminated acid through a dialyzing unit provided with a semi-permeable membrane substantially inert to the action of the acid, continuously passing an uncontaminated acidic solution of a concentration less than that of the acid to be purified on the other side of said membrane, thereby causing the acid to be diffused into said pure solution and water to be diffused in the opposite direction and effecting a dilution of the acid to be purified and the conversion of a part of the impurities into a filterable state, continuously withdrawing the undialyzed acid solution containing the filterable impurities from the dialyzing unit, separating the filterable impurities, and conveying the thus partially purified acid solution into a second dialyzing unit wherein said acid is dialyzed through a semi-permeable membrane into water.

2. The process according to claim 1, wherein the pure aqueous acid solution obtained in the second dialyzing unit is employed as the diffusion medium in the first dialyzing unit.

3. In a process for the purification of acids containing small percentages of carbonaceous impurities in a colloidal state, the steps of subjecting said contaminated acid to diffusion through a semi-permeable membrane into an aqueous acid solution having an acid concentration less than that of the acid to be purified, said diffusion being coupled with the passage of water into said contaminated acid solution and the conversion of at least a portion of the colloidal carbonaceous material into a solid suspended in the acid, removing said suspended solids and thereafter subjecting the partially purified acid solution produced after the separation of said suspended solids to dialysis, thereby obtaining an acid solution substantially free of carbonaceous impurities.

CARL D. LANE.
CHARLES H. DUFFY.